US 6,536,038 B1

(12) United States Patent
Ewertz et al.

(10) Patent No.: US 6,536,038 B1
(45) Date of Patent: Mar. 18, 2003

(54) DYNAMIC UPDATE OF NON-UPGRADEABLE MEMORY

(75) Inventors: James H. Ewertz, Portland, OR (US); Robert P. Hale, Portland, OR (US); Orville H. Christeson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/450,832

(22) Filed: Nov. 29, 1999

(51) Int. Cl.[7] .............................................. G06F 9/44
(52) U.S. Cl. ........................... 717/168; 717/169; 713/1; 713/2; 713/100; 711/1; 711/102; 711/103; 711/104; 711/105; 711/170
(58) Field of Search ................................ 717/168, 169; 713/500, 1, 2, 100; 711/170, 1, 102–105, 141; 365/230.04

(56) References Cited

U.S. PATENT DOCUMENTS

| | | | | |
|---|---|---|---|---|
| 5,121,360 A | * | 6/1992 | West et al. ............ | 365/230.04 |
| 5,210,854 A | * | 5/1993 | Beaverton et al. .......... | 711/103 |
| 5,247,484 A | * | 9/1993 | Watanabe .............. | 365/230.04 |
| 5,579,522 A | | 11/1996 | Christeson et al. ............ | 713/2 |
| 5,600,801 A | * | 2/1997 | Parks et al. ................. | 710/104 |
| 5,727,215 A | * | 3/1998 | Rynaski et al. ............. | 717/173 |
| 5,734,816 A | * | 3/1998 | Niijima et al. ................. | 714/8 |
| 5,765,175 A | * | 6/1998 | Needham et al. ........... | 707/206 |
| 5,799,200 A | * | 8/1998 | Brant et al. ................. | 713/340 |
| 5,832,263 A | * | 11/1998 | Hansen et al. .............. | 707/200 |
| 5,835,761 A | * | 11/1998 | Ishii et al. ..................... | 713/2 |
| 5,878,256 A | * | 3/1999 | Bealkowski et al. ........... | 713/2 |
| 5,930,504 A | | 7/1999 | Gabel ............................. | 713/2 |
| 5,930,515 A | * | 7/1999 | Ducharme et al. .......... | 717/169 |
| 6,073,252 A | * | 6/2000 | Moyer et al. ................... | 714/7 |
| 6,182,188 B1 | * | 1/2001 | Hasbun et al. .............. | 711/103 |
| 6,199,203 B1 | * | 3/2001 | Saboff ........................ | 717/168 |
| 6,205,548 B1 | * | 3/2001 | Hasbun ........................ | 713/2 |
| 6,237,091 B1 | * | 5/2001 | Firooz et al. ................ | 709/222 |
| 6,289,419 B1 | * | 9/2001 | Takahashi ................... | 711/141 |
| 6,412,043 B1 | * | 6/2002 | Chopra et al. .............. | 711/118 |

OTHER PUBLICATIONS

Title: Boot block recovery procedure for Micronics M4Pi Motherboard, http://www.firmeare.com/support/bios/m4pi–rec.htm), Aug. 10, 1998.*
Title: eNVY: A non–volatile, Main memory storage system, ACM, 1994, author: Wu el al.*
Title: The Rio Cache: Surniving operating system crashes, ACM, 1995, Author: Chen et al.*
Title: DSP Data memory layouts optimized for intermediate address pointer updates, author: Wess et al, IEEE, 1998.*
Title: Memory Management during Run Generation in External Sorting, author: Larson et al, 1998.*

* cited by examiner

Primary Examiner—Gregory Morse
Assistant Examiner—Chameli C. Das
(74) Attorney, Agent, or Firm—Kenyon & Kenyon

(57) ABSTRACT

A method for updating firmware. The method includes providing replaceable information in a non-modifiable storage and replacement information in a modifiable storage or a removable storage and providing a replacement indicator. The replacement information is accessed instead of the replaceable information based upon the replacement indicator.

30 Claims, 7 Drawing Sheets

DYNAMIC UPDATE OF NON-UPGRADEABLE MEMORY

FIELD OF THE INVENTION

The present invention pertains to the field of computer systems. More particularly, the present invention pertains to the field of computer system architectures incorporating a non-volatile form of basic operating system processing logic.

BACKGROUND OF THE INVENTION

A computing system typically uses a relatively fixed set of instructions.and data to boot up (initialize on power up) the system. The instructions and data used for boot up are typically stored in a non-volatile memory which is installed in the computing system. A non-volatile memory retains its contents even after power is removed from the memory. The set of instructions and data is fixed because it typically does not have to change after the memory is installed in the computing system. In fact if, after installation of the non-volatile memory in the computing system, the memory contents change accidentally the computing system may not operate properly, if at all. Soon after the computing system is turned on, the contents of the non-volatile memory are typically transferred to a volatile memory. The transfer is typically done because the instructions and data can be accessed more quickly from volatile memory rather than non-volatile memory. Also, often information is stored in a compressed format in the non-volatile memory, and is decompressed during the transfer to the volatile memory.

Memories which are non-volatile and whose contents are fairly difficult or impossible to change after being programmed (boot up memory) include basic read only memory (ROM) devices, programmable read only memory (PROM) devices, electrically erasable programmable read only memory (EEPROM) devices, erasable programmable read only memory (EPROM), and flash memory devices.

Typically, the contents of boot up memory are not changed after installation. However, it may be desirable to make changes to the contents after installation of the boot up memory without having to require a technician to physically remove the boot up memory and replace it. One way to make changes after installation of the boot up memory is to use a modifiable, non-volatile memory which can be modified or reprogrammed by downloading replacement information from a floppy disk or other device storing the replacement information. Modifiable memory devices include EEPROMs, EPROMs, flash memory devices, and other memory devices that allow modification without requiring physical removal and replacement. Each of the modifiable memory devices has its own benefits and disadvantages. These memory devices and other related memory devices have a common problem which will be described below by using a flash memory device.

A flash memory device typically contains separately eraseable/programmable blocks of memory. One of these blocks may be electronically locked (boot block or locked block) to prevent erasure or modification of its contents once it is installed. The remaining non-locked blocks or non-boot blocks can be modified after installation. Since a locked block does not allow programming, it has typically been used to only store information that is not likely to require modification (i.e., largely static code and data) after flash device is installed in the system. An example of largely static code and data is recovery code that is used to boot up a system when the firmware that is normally used to boot up the system needs modification or becomes corrupted. For a variety of reasons, including the increasing number of devices that the recovery code must be able to access, the size of the recovery code has been increasing dramatically. Among other reasons, the increased size of the recovery code has required use of symmetrically blocked flash devices (SBFs) instead of boot blocked flash devices (BBFs). Use of SBFs has occurred because, for devices of equal size, the SBFs have a larger boot block than the BBFs. The larger boot block of the SBFs can accommodate the recovery code. Unfortunately, for SBFs and BBFs of equal size, an increase in the size of the boot block of an SBF comes at the expense of the remaining blocks. In other words, for SBFs and BBFs of equal size, the remaining area (i.e., the non-boot blocks) on an SBF is smaller than the non-boot block area on the BBF. The decrease in the non-boot block area means that there is less space for code and data in th non-boot block area. Consequently, some of the largely dynamic code and data that used to be put in a non-boot block must now be placed in the boot block.

Since largely dynamic code and data, even if it is present in a boot block, may require modification after installation of the flash device in a system, it would be desirable to be able to update the dynamic code. It would also be desirable to update the largely static code and data even though it is in a boot block.

SUMMARY OF THE INVENTION

A method for updating firmware is described. The method includes providing replaceable information in a non-modifiable storage and replacement information in a modifiable storage or a removable storage and providing a replacement indicator. The replacement information is accessed instead of the replaceable information based upon the replacement indicator.

BRIEF DESCRIPTION OF THE DRAWINGS

The present invention is illustrated by way of example, and not limitation, in the figures of the accompanying drawings in which.

DETAILED DESCRIPTION

A method and apparatus for updating firmware is described below. In the following description, for purposes of explanation, numerous specific details are set forth in order to provide a thorough understanding of the present invention. It will be evident, however, to one skilled in the art that the present invention may be practiced in any computing system, especially personal computers, without these specific details. In other instances well known operations, functions and devices are not shown in order to avoid obscuring the invention.

Figure 1:
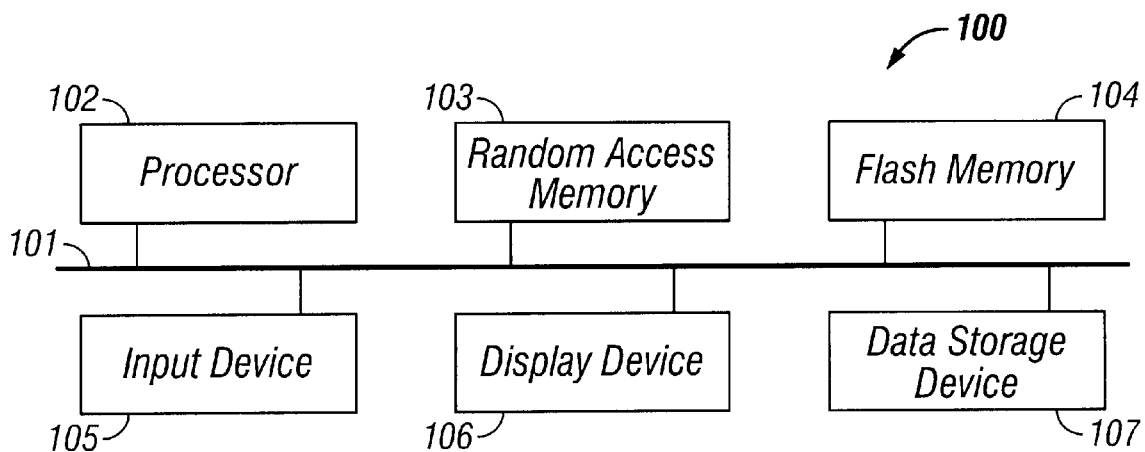
FIG. 1 illustrates a block diagram of a computing system in accordance with this invention.

Referring to FIG. 1, a block diagram of a digital system 100 in accordance with the present invention is illustrated. Digital system 100 can be a computer system, server, or any of a variety of set-top boxes, entertainment systems, video game machines, or embedded systems. System 100 comprises a bus 101, a processor 102, a random access memory (RAM) device 103, a flash memory device 104, an input device 105 such as a keyboard or cursor control device for communicating information, a display device 106, and a data storage device 107. Processor 102 processes information (e.g., instructions and data) retrieved from bus 101. Processor 102 may be a microprocessor, a microcontroller, a graphics processor, a digital signal processor, a direct memory access controller, or any other circuit that can be caused to perform different functions sequentially. One of ordinary skill of the art would appreciate that for one embodiment the functionality of processor 102 can be provided by a circuit that implements a state machine having the functions attributed to processor 102. For an embodiment in accordance with the present invention, processor 102 is an Intel Pentium® III processor (manufactured by Intel Corporation of Santa Clara, Calif.). RAM device 103 communicates stored information and instructions to processor 102 through bus 101. Input device 105, such as a keyboard or cursor control device, communicates information and command selections to the processor 102 through bus 101. Display device 106 displays to a computer user information retrieved from processor 101, RAM device 103 and other devices attached to bus 101. Data storage device 107 such as a magnetic disk and disk drive stores information and instructions and communicate this information and instructions to bus 101. For another embodiment device 107 may include a hard disk drive or a zip drive. One of ordinary skill in the art would appreciate that alternative embodiments in accordance with the present invention need not have all the elements shown in FIG. 1.

Flash memory 104, coupled to bus 101, stores non-volatile code and data. Flash 104 provides a non-volatile form of memory that is not destroyed when power is removed from the computer system. Software (programs and data) stored in hardware such as non-volatile memory is often referred to as firmware and is found in many digital systems. The basic input/output system (BIOS) logic of a computing system and firmware is typically stored in a flash memory device such as flash 104. In addition, other system software and application specific parameters may also be stored in flash 104. For example, portions of flash memory may be used for storage of local area network (LAN) processing logic or small computer standard interface (SCSI-2, American National Standards Institute (ANSI)) processing logic.

While system 100 is described as including flash memory 104, one of ordinary skill in the art would appreciate that in alternative embodiments in accordance with this invention other non-volatile memory devices that can be reprogrammed may also be used (e.g., electrically erasable programmable read only memory (EEPROM)). Consequently, this invention should not be limited by the remaining description that will primarily be presented for ease of understanding in the context of a flash memory device.

A flash memory device is typically partitioned into several blocks some of which may be separately erased and reprogrammed with new information using electrical signals. A flash memory device may also have a block that is electronically locked to prevent erasure or modification of its contents once it is installed. While the block is electronically locked it cannot be reprogrammed.

Since a locked block does not allow reprogramming, it has typically been used to only store information that is not likely to require modification after the flash device is installed (i.e., largely static code and data) in the system. However, the size of a locked block has increased to the point that it now typically contains a mixture of largely static code and data, and information that is likely to require modification after the flash device is installed (i.e., largely dynamic code and data). Since the locked block cannot be reprogrammed, the code and data (replaceable information) in the locked block cannot be changed while it is still in the locked block. Fortunately, the replaceable information is typically not accessed for processing while it is in the locked block. Rather, the replaceable information is typically copied to a modifiable storage, and then it is accessed from the modifiable storage for processing. An example of modifiable storage in an embodiment in accordance with the present invention is RAM. While the replaceable information is in RAM and before the processor accesses the RAM to retrieve the replaceable information for processing, the replaceable information can be modified. Replaceable information that has been modified is referred to herein as modified replaceable information. By modifying the replaceable information before the processor accesses the RAM to retrieve information for processing, when the processor does eventually access the RAM the processor will find the modified replaceable information in RAM rather than the replaceable information that was copied from the locked block.

Replaceable information is modified to generate modified replaceable information using replacement information and a replacement indicator (or indicators) that are stored in a non-volatile, modifiable storage device (replacement storage). The modifiable storage includes removable storage devices, such as floppy disks and disk drives, zip cartridges and zip drives, compact disk and compact disk drive, and other types of storage that can be exchanged. The type of modified replaceable information that is produced depends upon the nature of the replacement information and the replacement indicators stored in the replacement storage. By changing the replacement information and the replacement indicators, various types of modified replaceable information can be produced. Since the replacement information and the replacement indicator are stored in a non-volatile, modifiable or removable storage, unlike the replacement information that is stored in a locked block (or non-modifiable storage), it is possible to change the replacement information and replacement indicators by either modifying the contents of the storage (e.g., reprogramming a non-locked block of a flash device) or replacing the storage medium with another storage medium (e.g., a different floppy disk, compact disk, zip drive, etc . . . ). Methods and apparatus for changing replacement information and replacement indicators are not described in detail here in order not to obscure the present invention. Replacement information and replacement indicators can be changed by a variety of methods and using a variety of apparatus that should be apparent to one of ordinary skill in the art. Below is a more detailed description of the method and apparatus of the present invention.

Figure 2:
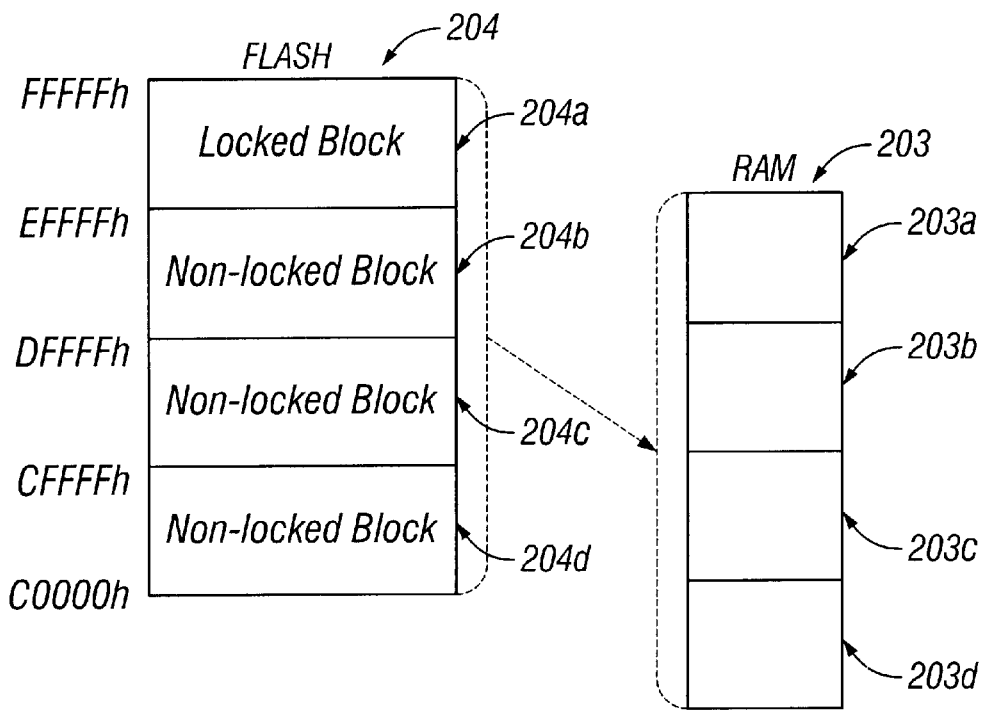
FIG. 2 illustrates a representation of the organization of a non-volatile memory and a volatile memory in accordance with this invention.

FIG. 2 illustrates representations of the organization of a non-volatile memory and a volatile memory in an embodiment in accordance with the present invention. Map 204 illustrates a representation of the organization of flash 104. Map 203 illustrates a representation of the organization of RAM 103. Map 204 comprises four blocks 204a–d. Map 203 comprises four blocks 203a–d. While RAM 103 and flash 104 are shown as having four blocks, in an alternative embodiment in accordance with this invention, RAM 103 and flash 104 may have fewer, or more blocks, as well as blocks of different sizes. Block 204a is a locked block (or boot block), while blocks 204b–d are not locked (non-locked) and may be reprogrammed. Blocks 203a–d are modifiable because they exist in RAM 103.

According to an embodiment in accordance with the present invention, processor 102 executes instructions in flash 104 which direct processor 102 to copy some or all the contents of flash 104 to RAM 103. The instructions can be located in block 204a. An example of an instruction which causes the contents of memory to be moved from one location to another location according to an embodiment of the present invention is the REP MOVS instruction which is part of the instruction set of many Intel architecture processors including the Pentium® III. One of ordinary skill in the art would appreciate that the exact instruction or instructions needed is processor dependent. In an alternative embodiment in accordance with this invention, processor 102 may execute more than one instruction to achieve the transfer. Additionally, in yet another alternative embodiment in accordance with this invention, processor 102 (or another circuit) may decompress some or all the contents of flash before copying them to RAM 103. Methods for decompressing are not described in detail here in order not to obscure the present invention. The terms transfer, move, and copy are used herein to mean that the contents (code and/or data) of a first area of storage is taken to a second area of the same or different storage. More specifically, blocks 204a–d are transferred to blocks 203a–d as represented by the dashed line in FIG. 2. After transfer, information copied to blocks 203a–d from blocks 204a–d does not necessarily have the same order as the information in blocks 204a–d. Additionally, the information in blocks 204a–d may have a different size because the information may have been decompressed during transfer.

Block 204a of flash 104 contains both largely static code and data and largely dynamic code and data, and is copied by processor 102 to a block of RAM 103. Block 204a is the boot block and cannot be erased or modified. However, by copying the contents of block 204a to a block of RAM 103 the contents can later be modified while they are in RAM 103. Thus, after modifying the contents while in RAM 103, when processor 102 retrieves the modified contents from RAM 103 for processing, it will retrieve contents that are different from the contents of block 204a.

Figure 3A:
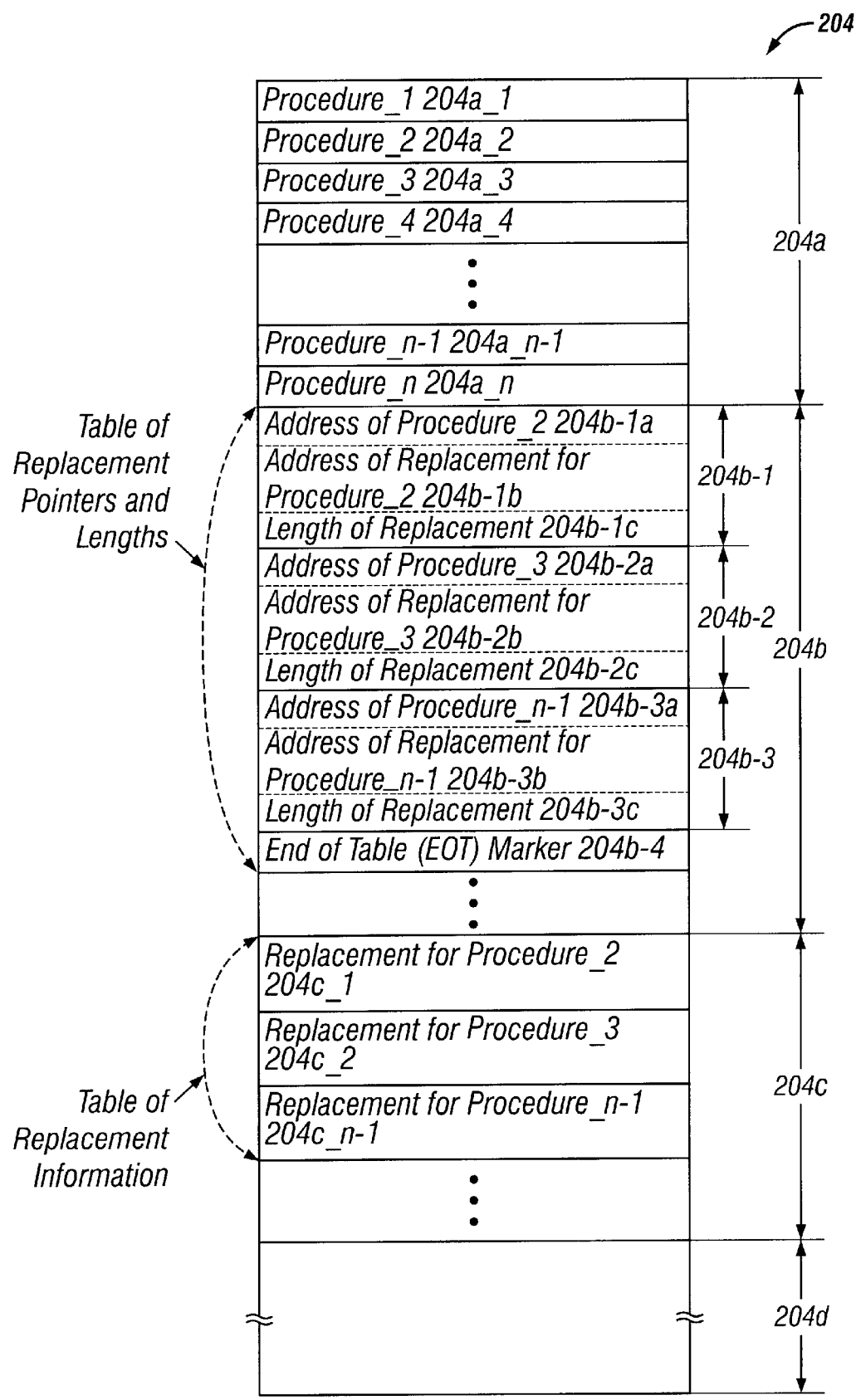
FIG. 3a is a memory map of a volatile or a non-volatile memory in accordance with an embodiment of this invention.

Blocks 204a–d are represented in greater detail in FIG. 3a which illustrates a memory map of a non-volatile memory in accordance with an embodiment of the present invention. Referring to FIG. 3a, memory map 204 is representative of the organization of flash 104 in an embodiment in accordance with the present invention. Block 204a includes a plurality of procedures (replaceable information): procedure_1 through procedure_n. In an alternative embodiment block 204a may include at least one data structure. Block 204b includes a table of replacement indicators 204b-1, 204b-2, 204b-3 and an end of table (EOT) marker 204b-4. Block 204c includes a table of replacement information 204c_1, 204c_2, and 204c_3. One of ordinary skill in the art would appreciate that there are other ways of managing a table without using a EOT maker. Replacement information 204c_1 is a replacement for procedure_2 of block 204a. Replacement information 204c_2 is a replacement for procedure_3 of block 204a. Replacement information 204c_3 is a replacement for procedure_n-1 of block 204a. While procedure_2, procedure_3, and procedure_n-1 are in the boot block 204a, replacement information 204c_1, 204c_2, and 204c_3 cannot be used to replace these procedures because the boot block is non-modifiable. By copying the procedures (or replaceable information) to a modifiable memory (e.g., RAM 103), it is possible to modify the procedures by copying replacement information into the appropriate places in the portion of modifiable memory in which the procedures are stored.

Figure 3B:
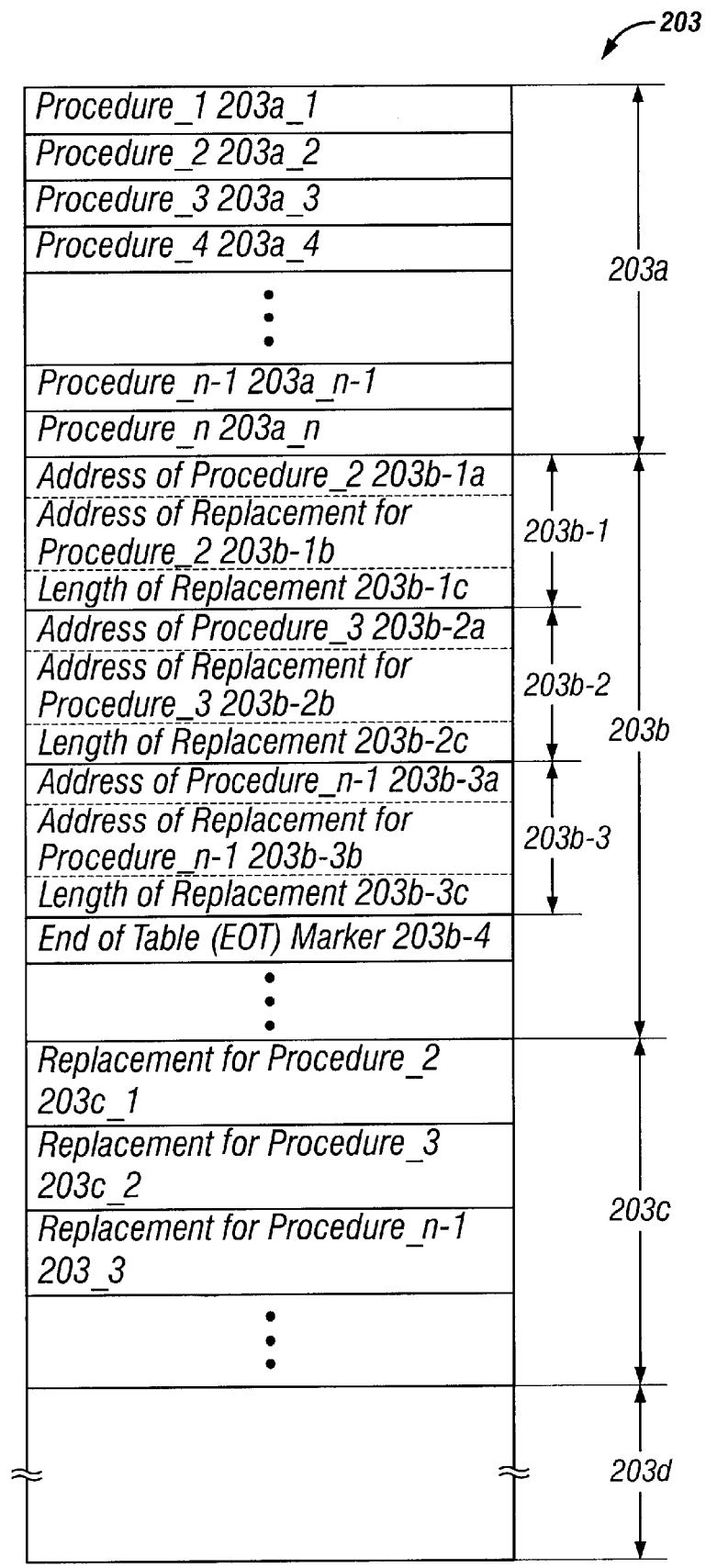
FIG. 3b is a memory map of a non-volatile memory in accordance with another embodiment of this invention.

Blocks 203a–d are represented in greater detail in FIG. 3b which illustrates a memory map of a volatile memory in accordance with an embodiment of the present invention. Referring to FIG. 3b, memory map 203 is representative of the organization of RAM 103 right after processor 102 has finished copying blocks 204a–d from flash 104 to blocks 203a–d, respectively, of RAM 103. The description given above with regards to the contents of blocks 204a, 204b, and 204c is also applicable to the contents of blocks 203a, 203b, and 203c, respectively, right after processor 102 has done its copying. Referring to FIG. 3b, processor 102 uses the information in replacement indicators 203b-1, 203b-2, 203b-3 to copy replacement information 203c_1, 203c_2 and 203c_3 to block 203a to replace procedure_2, procedure_3, and procedure_n-1, respectively. The manner in which processor 102 uses the information in the replacement indicators is described in greater detail below.

In an alternative embodiment in accordance with the present invention, only block 204a is copied to block 203a, and blocks 204b–d are not copied to blocks 203b–d, respectively, of RAM 103. Additionally, according to this alternative embodiment, processor 102 uses the replacement indicators in block 204b of flash 104 to copy appropriate replacement information from block 204c of flash 104 to block 204a in RAM 103.

Referring to block 203b, replacement indicator 203b-1 includes starting address 203b-1a for procedure_2 203a_2, starting address 203b-1b for replacement for procedure_2 203c_1, and length 203b-1c of replacement for procedure_2 203c_1. The starting address of a procedure in block 203a is also referred to herein as an entry pointer, making these terms interchangeable. The starting address for a replacement for a procedure is also referred to herein as a replacement entry pointer, making these terms interchangeable. Length 203b-1c is the length of replacement for procedure_2 203c_1. Length can be the number of bytes, words, or double words, etc . . . . Similarly, replacement indicator 203b-2 includes an address 203b-2a for procedure_3, an address 203b-2b for replacement for procedure_3 of block 203a, and a length 203b-2c of replacement for procedure_3 203c_2. Replacement indicator 203b-3 includes starting address 203b-3a for procedure_n-1, starting address 203b-3b for replacement for procedure_n-1 of block 203a, and length 203b-3c of replacement for procedure 203c_3. Lengths 203b-1c and 203b-2c are the lengths of the replacement information 203c-2 and 203c-3.

After processor 102 copies blocks 204a–d of flash 104 to blocks 203a–d RAM 103, respectively, processor 102 sequences through the replacement indicators 203b-1, 203b-2, and 203b-3. The description given above with regards to the contents of blocks 204b and 204c is also applicable to the contents of blocks 203b and 203c, respectively, and need not be repeated here. Processor 102 first retrieves address 203b-

Figure 3C:
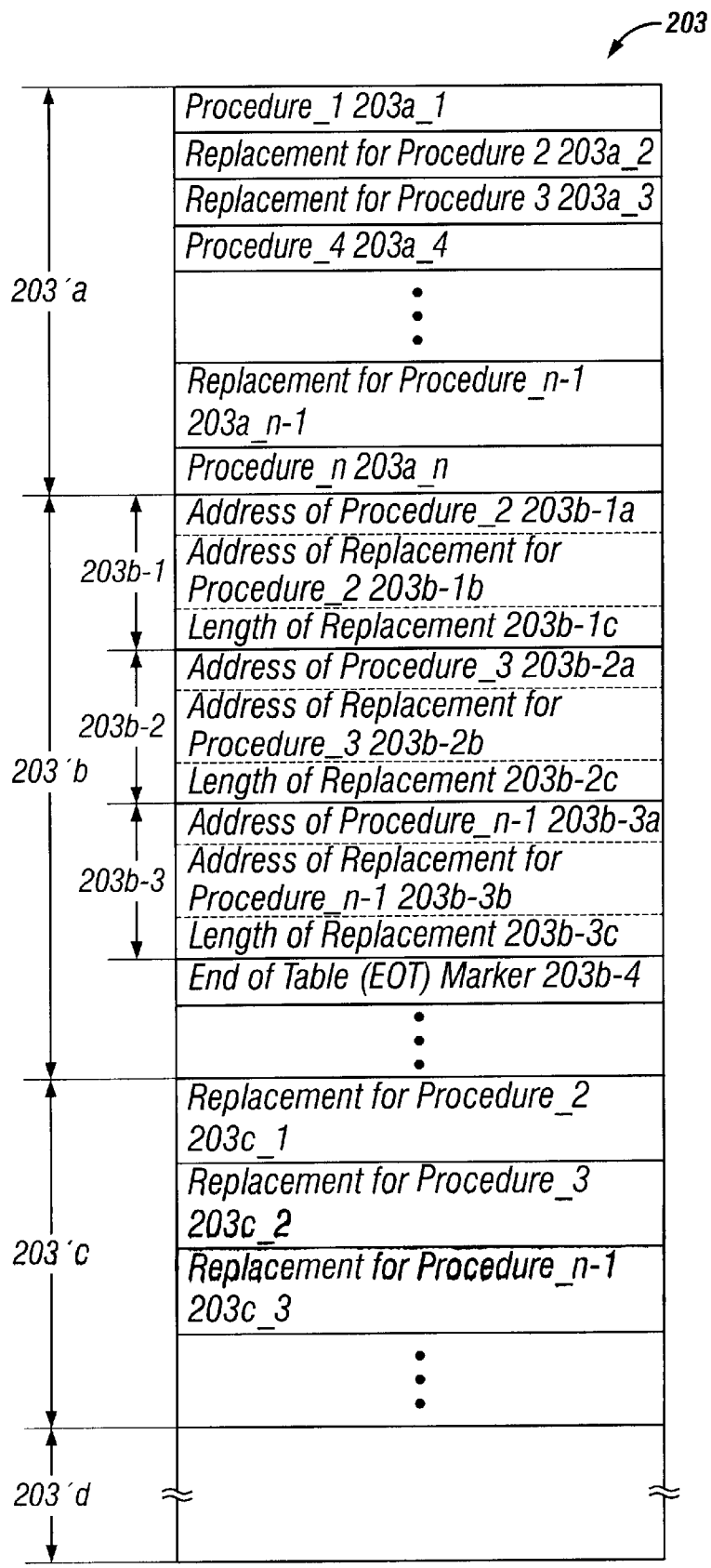
FIG. 3c is a memory map of a volatile memory whose contents have been updated in accordance with an embodiment of the present invention.

1*a*, address 203*b*–1*b*, and length 203*b*-1*c*. Address 203*b*-1*a* is an entry pointer to procedure_2 (or in other words, the starting address for procedure_2). Address 203*b*-1*b* is a starting address of the replacement for procedure_2 (or replacement entry pointer). Length 203*b*–1*c* is the length of the replacement for procedure_2. Processor 102 then executes at least one instruction which causes the contents of the memory locations between starting address 203*b*-1*b* and address 203*b*-1*b* plus length 203*b*-1*c* to be moved to the memory locations starting at address 203*b*-1*a* to 203*b*-1*a* plus length 203*b*-1*c*. Processor 102 executes instructions using replacement indicators 203*b*-2 and 203*b*-3 to move replacement information from block 203*c* to block 203*a* in a manner similar to what was described above in connection with processor 102 using replacement indicator 203*b*-1 to move replacement information 203*c*-1 to replace procedure_2. When processor 102 retrieves the EOT marker 203*b*-4, processor 102 stops retrieving replacement indicators from block 203*b* for processing. FIG. 3*c* illustrates a memory map of a volatile memory whose contents have been updated in accordance with an embodiment of the present invention. Referring back to FIG. 3*b*, when block 204*a* was first copied to block 203*a*, block 203*a* has procedure_2, procedure_3, and procedure_n–1 in locations 203*a*_2, 203*a*_3, and 203*a*_n–1, respectively. However, referring again to FIG. 3*c*, memory map 203' of RAM 103 illustrates the contents of RAM 103 after processor 102 finishes copying replacement information from block 203*c* to block 203*a*. After processor 102 finishes copying replacement information from block 203*c* to block 203*a*, block 203*a* includes replacement for procedure_2, replacement for procedure_3, and replacement for procedure_n–1, in locations 203*a*_2, 203*a*_3, and 203*a*_n–1, respectively.

In an alternative embodiment in accordance with this invention, the replacement procedure copied from block 203*c* to replace a procedure in block 203*a* may only be a single jump or call instruction. The single instruction would be copied to the starting address of a procedure in block 203*a* which is no longer going to be executed. The operand of the jump or call instruction is the starting address of replacement information in block 203*c*. When the processor executes the jump or call instruction, processor 102 will stop executing instructions in block 203*a* and start executing instructions at the starting address of the replacement information in block 203*c*. Consequently, in this manner, replacement information will be processed rather than the procedure copied from block 204*a* of flash 104 into block 203*a* of RAM 103.

Figure 4A:
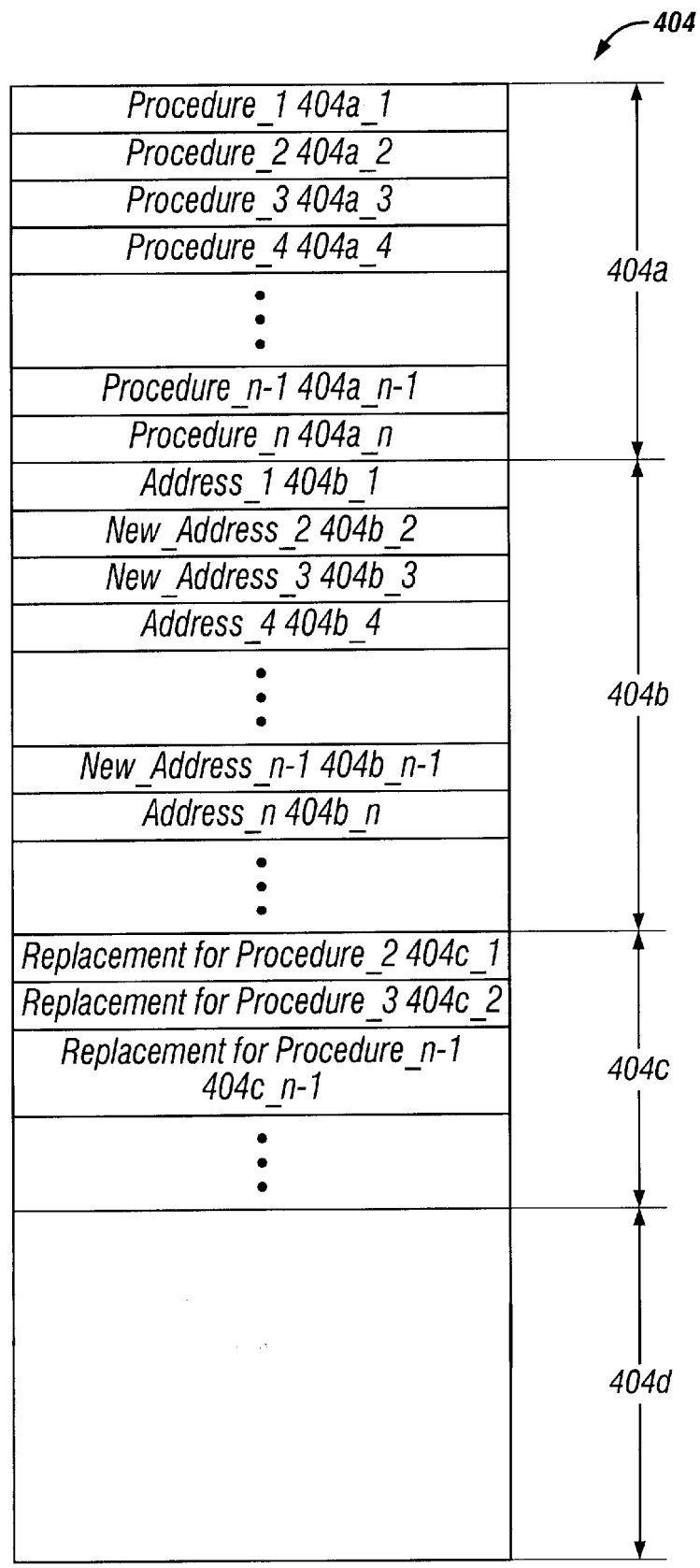
FIG. 4a is a memory map of a volatile memory in accordance with another embodiment of this invention.

FIG. 4*a* illustrates another memory map of a non-volatile memory, such as flash 104, in accordance with another embodiment of the present invention. Map 404 includes block 404*a* which includes a plurality of procedures (replaceable information): procedure_1 through procedure_n. For an alternative embodiment block 404*a* may include at least one data structure. Block 404*b* includes a table (or array) of replacement indicators 404*b*-1, 404*b*-2, and 404*b*-3 through 404*b*-n. Block 404*c* includes a table of replacement information 404*c*-1, 404*c*-2, and 404*c*-3. Replacement information 404*c*-1 is a replacement for procedure_2 of block 404*a*. Replacement information 404*c*-2 is a replacement for procedure_3 of block 404*a*. Replacement information 404*c*-3 is a replacement for procedure_n–1 of block 404*a*.

Figure 4B:
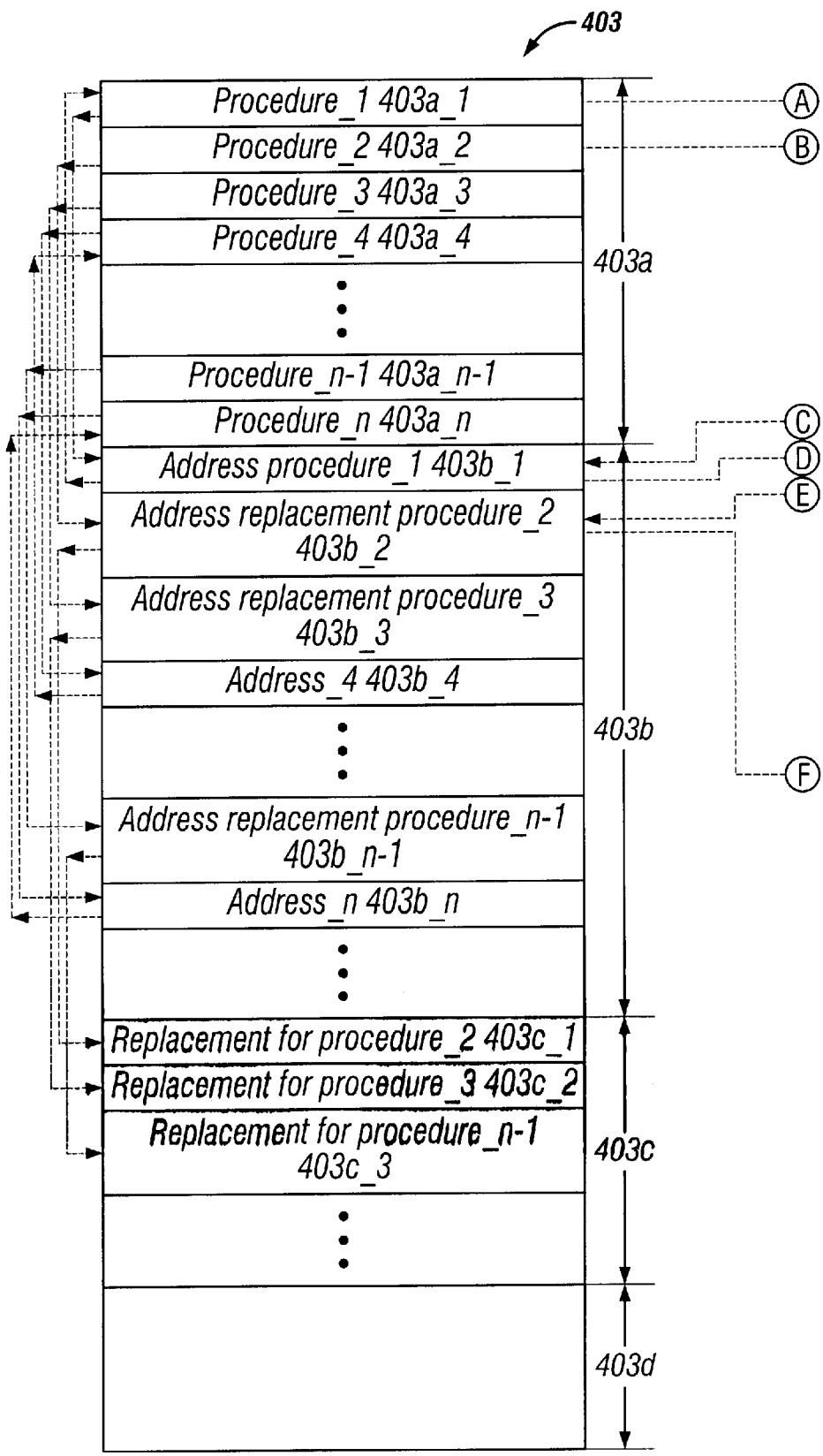
FIG. 4b is a memory map of a non-volatile memory in accordance with another embodiment of this invention.

Processor 102 copies blocks 404*a*–*d* of flash 104 to blocks 403*a*–*d*, respectively, of FIG. 4*b*, of RAM 103. FIG. 4*b* illustrates a memory map of a volatile memory such as RAM 103 right after processor 102 has finished copying blocks 404*a*–*d* to blocks 403*a*–*d* for an embodiment in accordance with the present invention. The above description about the contents of block 404*a*, 404*b*, and 404*c* is also applicable to the contents of blocks 403*a*, 403*b*, and 403*c*, respectively, and need not be repeated here. Processor 102 uses the information in replacement indicators 403*b*_2, 403*b*_3, and 403*b*_n–1 to process replacement information 403*c*-1, 403*c*-2, 403*c*-3 instead of procedure_2, procedure_3, and procedure_n–1, respectively. Replacement indicators 403*b*_2, 403*b*_3, and 403*b*_n–1 contain starting addresses for replacement for procedure_2 403*c*_1, replacement for procedure_3 403*c*_2, and replacement for procedure_n–1 403*c*_3, respectively, which are in block 403*c*. Replacement indicators 403*b*_1, 403*b*_4, and 403*b*_n, on the other hand, contain starting addresses for procedure_1 403*a*_1, procedure_4 403*a*_4, procedure_n 403*a*_n, respectively, which are in block 403*a*. Referring to block 403*b*, 403*b*_1 contains a starting address for procedure_1 403*a*_2, a starting address 403*b*_2 for replacement for procedure_2 403*c*_1, a starting address 403*b*_3 for replacement for procedure_3 block 403*c*_2, a starting address 403*b*_4 for procedure_4 403*a*_4, a starting address 403*b*_n–1 for replacement for procedure_n–1 403*c*_3, and a starting address 403*b*_n for procedure_n 403*a*_n.

Figure 4C:
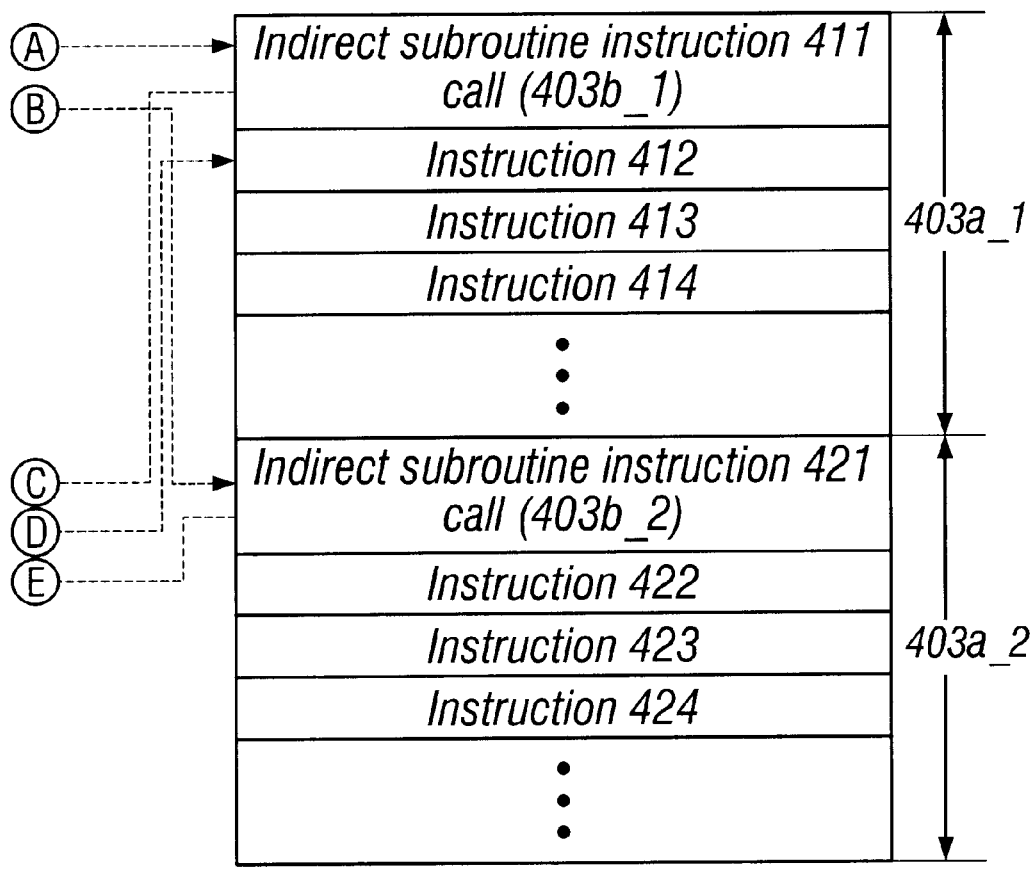
FIGS. 4c and 4d illustrate instructions in a volatile memory in accordance with another embodiment of this invention.

Procedure_1 and procedure_2 are represented in greater detail in FIG. 4*c* which illustrates instructions in a volatile memory for an embodiment in accordance with the present invention. Referring to FIG. 4*c*, 403*a*_1 includes instructions 411–414 for procedure_1, and 403*a*_2 includes instructions 421–424 for procedure_2. After processor 102 copies the contents of flash 104 to RAM 103, processor 102 processes the replaceable information in block 403*a*. When processor 102 executes procedure_1, it retrieves instruction 411 for processing. Instruction 411 is an indirect call instruction having address of replacement indicator 403*b*_1 as an operand. Replacement indicator 403*b*_1 points to the starting address of instruction 412, the instruction following indirect call instruction 411. Instruction 411 causes processor 102 to start executing instructions at instruction 412. The address of instruction 412 (or more generally the address of the instruction following the indirect call instruction) is referred to herein as the starting address of procedure_1 (or the procedure being referred to). If address 403*b*_1 pointed to an address other then the starting address of procedure_1, processor 102 would have been diverted to another memory location for executing instructions. In other words, by storing an appropriate address in a replacement indicator of block 404*b* (which eventually ends up in block 403*b*), processor 102 can be caused to execute either a procedure in block 403*a* or a replacement procedure in block 403*c*.

Figure 4D:
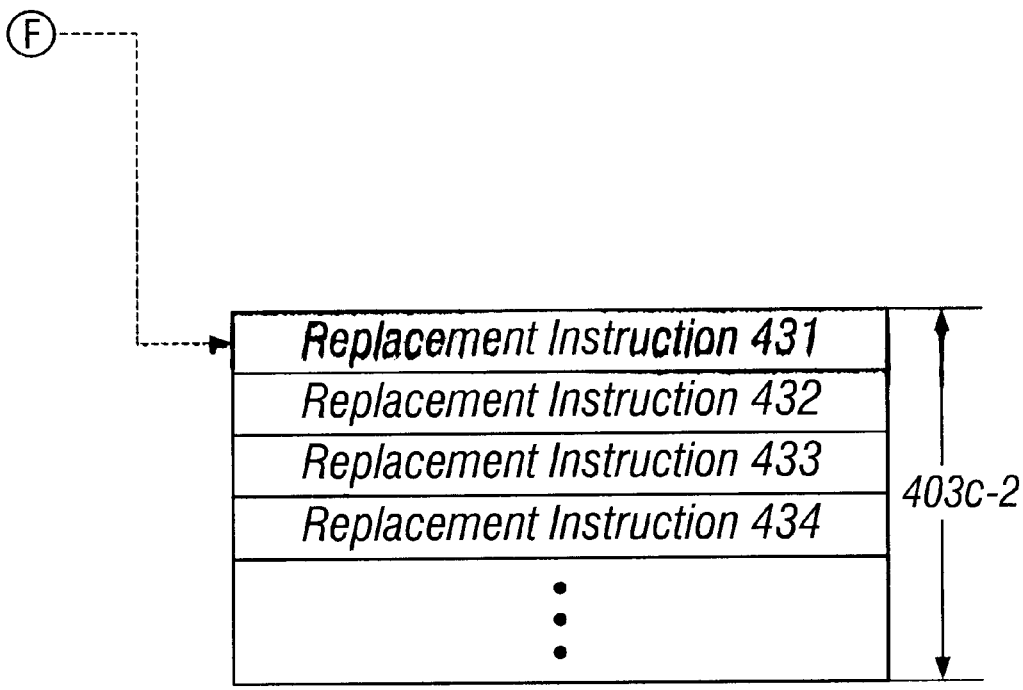

An example of how processor 102 is diverted to execute a replacement procedure in block 403*c* will be described below by resorting to FIG. 4*d* which illustrates instructions in a volatile memory in an embodiment in accordance with this invention. FIG. 4*d* illustrates instructions 431–434 of the replacement for procedure_2 403*c*_1 in block 403*c*. When processor 102 executes procedure_2, it retrieves instruction 421 for processing. Instruction 421 is also an indirect call instruction and it causes processor 102 to start executing instructions at the address pointed to by address 403*b*_2. Address 403*b*_2 points to the starting address of replacement for procedure_2 403*c*_2 in block 403*c* instead of the address of an instruction in procedure_2 of block 403*a*. Referring to FIG. 4*d*, the diversion of processor 102 from executing instructions in block 403*a* to executing instructions in block 403*c* is depicted by the dotted line going from instruction 421 of procedure_2 403a_2 to replacement indicator 403b_2 and the dotted line going from replacement indicator 403b_2 to replacement instruction 431 in replacement for procedure 403c-2. Consequently, by specifying the starting addresses in the replacement indicators of block 404b (which eventually end up in block 403b), processor 102 can be diverted from accessing procedures in block 404a to accessing replacement procedures in block 404c.

While in the above description a processor copied the contents of flash memory to volatile memory (e.g., RAM 103) and replaced some of the content of the volatile memory with other content of the volatile memory, in an alternative embodiment, a control unit comprising control logic executes a state machine to perform the above functions.

Thus, a method and apparatus for updating firmware in a non-volatile memory has been described. Although the present invention has been described with reference to specific exemplary embodiments, it will be appreciated by one of ordinary skill in the art that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for updating firmware, the method comprising:
   providing replaceable information in a non-modifiable storage and replacement information in a modifiable storage;
   providing a replacement indicator; and
   accessing the replacement information instead of the replaceable information based upon the replacement indicator.

2. The method of claim 1, wherein the non-modifiable storage is a non-modifiable block of a non-volatile memory and the modifiable storage is at least one modifiable block of the non-volatile memory, further comprising:
   transferring the replaceable information to a first portion of a modifiable memory;
   wherein the at least one modifiable block of the non-volatile memory includes the replacement indicator.

3. The method of claim 2, further comprising:
   moving the replacement indicator from the at least one modifiable block of non-volatile memory to the modifiable memory.

4. The method of claim 2, further comprising:
   transferring the replacement information to a second portion of the modifiable memory.

5. The method of claim 4, wherein accessing includes transferring the replacement information from the second portion of the modifiable memory to the first portion of the modifiable memory to replace the replaceable information in the first portion of the modifiable memory based upon the replacement indicator.

6. The method of claim 4, wherein the replaceable information remains in the first portion of the modifiable memory while accessing the replacement information instead of the replaceable information.

7. The method of claim 4, wherein the replacement indicator includes an entry pointer to the replaceable information, further comprising transferring the entry pointer from the at least one modifiable block of non-volatile memory to modifiable memory.

8. The method of claim 7, wherein the replacement indicator includes a replacement entry pointer to the replacement information, further comprising:
   transferring the replacement entry pointer from the at least one modifiable block of non-volatile memory to modifiable memory; and
   moving contents of memory locations in the second portion of the modifiable memory starting at the replacement entry pointer to memory locations in the first portion of the modifiable memory starting at the entry pointer.

9. The method of claim 4, wherein the replacement indicator includes an indirect address pointing to the replacement information and the replacement information includes at least one instruction pointed to by the indirect address and accessing the replacement information includes executing an indirect call instruction from the first portion of the modifiable memory to cause a processor to start executing the at least one instruction.

10. The method of claim 4, wherein the replacement indicator includes an indirect address pointing to the replacement information and accessing the replacement information includes executing an indirect retrieve instruction from the first portion of the modifiable memory to retrieve the replacement information pointed to by the indirect address.

11. The method of claim 2, wherein accessing includes transferring the replacement information from the at least one block of the non-modifiable memory to replace the replaceable information in the first portion of the modifiable memory based upon the replacement indicator.

12. The method of claim 1, wherein the replacement information includes at least one instruction for execution by a processor and accessing includes executing the at least one instruction by the processor.

13. The method of claim 1, wherein the replacement information includes at least one first instruction and the replaceable information includes at least one second instruction and accessing includes executing the at least one first instruction by the processor when the replacement indicator indicates that the at least one first instruction is to be executed instead of the at least one second instruction.

14. A digital system, comprising:
   a non-volatile storage including a non-modifiable storage and a modifiable storage;
   wherein replaceable information is stored in the non-modifiable storage and replacement information and a replacement indicator are stored in the modifiable or removable storage;
   a processor coupled to the non-volatile storage; and
   wherein the processor accesses replacement information instead of the replaceable information based upon the indicator.

15. The method of claim 14, wherein the non-volatile storage is a flash memory.

16. The system of claim 14, further comprising a modifiable memory including a first portion and a second portion.

17. The method of claim 16, wherein the modifiable memory is a random access memory.

18. The system of claim 16, wherein the processor transfers the replaceable information to the first portion of the modifiable memory.

19. The system of claim 18, wherein the processor transfers the replacement information to the second portion of the modifiable memory.

20. The system of claim 19, wherein the replacement information includes at least one first instruction and the replaceable information includes at least one second instruction and the processor executes the at least one first instruction instead of the at least one second instruction based upon the replacement indicator.

21. The system of claim 19, wherein the replacement indicator includes an indirect address pointing to the replacement information and the processor executes an indirect call instruction from the first portion of the modifiable memory to jump to the replacement information pointed to by the indirect address.

22. The system of claim 19, wherein the replacement indicator includes an indirect address pointing to the replacement information and the processor executes an indirect retrieve instruction from the first portion of the modifiable memory to retrieve the replacement information pointed to by the indirect address.

23. The system of claim 19, wherein the processor transfers the replacement information from the second portion of the modifiable memory to the first portion of the modifiable memory to replace the replaceable information in the first portion of the modifiable memory based upon the replacement indicator.

24. The system of claim 18, wherein the processor transfers the replacement information from the modifiable or removable storage to the first portion of the modifiable memory to replace the replaceable information in the first portion of the modifiable memory based upon the replacement indicator.

25. A computer readable storage medium having stored thereon instructions which when executed by a processor result in:

transferring replaceable information from a non-modifiable storage to a modifiable storage;

transferring replacement information from a first modifiable storage to a second modifiable storage; and accessing the replacement information instead of the replaceable information based upon a replacement indicator.

26. The computer readable storage medium of claim 25, further comprising:

transferring the replacement indicator from the first modifiable storage or the removable storage to the second modifiable storage.

27. The computer readable storage medium of claim 26, wherein accessing includes executing at least one instruction in the replacement information instead of the replaceable information based upon the replacement indicator.

28. The computer readable storage medium of claim 25, further comprising, decompressing the replaceable information.

29. The computer readable storage medium of claim 25, further comprising, decompressing the replacement information.

30. The computer readable storage medium of claim 25, wherein accessing includes transferring replacement information from a first part of the second modifiable storage to a second part of the second modifiable storage to replace replaceable information in the second part of the modifiable storage based upon the replacement indicator.

* * * * *